United States Patent
Quatrano

(10) Patent No.: US 10,814,687 B2
(45) Date of Patent: Oct. 27, 2020

(54) VEHICLE STRUT MOUNT

(71) Applicant: Ford Global Technologies, LLC, Dearborn, MI (US)

(72) Inventor: Nicholas Anthony Quatrano, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 144 days.

(21) Appl. No.: 16/107,291

(22) Filed: Aug. 21, 2018

(65) Prior Publication Data

US 2020/0062063 A1     Feb. 27, 2020

(51) Int. Cl.
| | |
|---|---|
| *B60G 15/06* | (2006.01) |
| *B60G 17/016* | (2006.01) |
| *B62D 17/00* | (2006.01) |
| *F16F 9/54* | (2006.01) |

(52) U.S. Cl.
CPC ....... *B60G 15/068* (2013.01); *B60G 17/0163* (2013.01); *B62D 17/00* (2013.01); *F16F 9/54* (2013.01); *B60G 2202/42* (2013.01); *B60G 2204/128* (2013.01); *B60G 2204/41* (2013.01); *B60G 2204/4232* (2013.01); *B60G 2204/62* (2013.01)

(58) Field of Classification Search
CPC ........ B60G 15/068; B60G 3/26; B60G 3/265; B60G 17/016; B60G 2204/182; B62D 17/00
See application file for complete search history.

(56) References Cited

U.S. PATENT DOCUMENTS

| | | | | |
|---|---|---|---|---|
| 2,605,118 | A * | 7/1952 | Booth | B62D 17/00 |
| | | | | 280/86.756 |
| 2,907,578 | A * | 10/1959 | Taber | B60G 3/26 |
| | | | | 280/5.508 |
| 5,094,472 | A | 3/1992 | Oyama et al. | |
| 5,143,400 | A * | 9/1992 | Miller | B62D 17/00 |
| | | | | 180/413 |
| 7,527,275 | B2 | 5/2009 | Choi | |
| 8,565,973 | B2 | 10/2013 | Wein | |
| 8,973,929 | B1 | 3/2015 | Seo et al. | |
| 9,216,625 | B2 * | 12/2015 | Ramirez Ruiz | B60G 7/003 |
| 2014/0239603 | A1 * | 8/2014 | Balandin | B62D 17/00 |
| | | | | 280/5.521 |
| 2018/0201319 | A1 * | 7/2018 | Rogers | B60G 17/016 |

FOREIGN PATENT DOCUMENTS

| | | |
|---|---|---|
| DE | 102015203121 A1 | 8/2016 |
| JP | 2841774 B2 | 3/1992 |
| KR | 101461903 B1 | 11/2014 |

* cited by examiner

*Primary Examiner* — James A English
(74) *Attorney, Agent, or Firm* — Raymond L. Coppiellie; Bejin Bieneman PLC

(57) ABSTRACT

An assembly includes a leadscrew, a strut, and a motor. The strut is movable along the leadscrew upon rotation of the leadscrew. A camber angle of a wheel is changeable according to movement of the strut along the leadscrew. The motor is drivably connected to a rotating shaft that is mounted to the leadscrew.

20 Claims, 8 Drawing Sheets

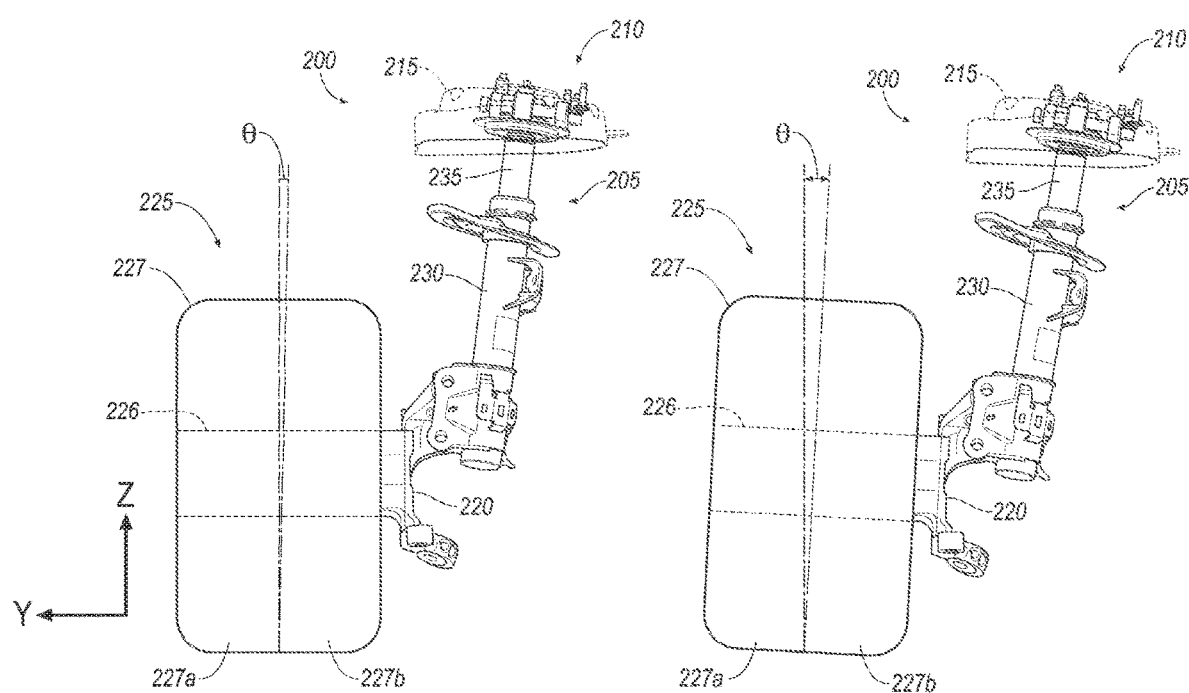

VEHICLE STRUT MOUNT

BACKGROUND

Vehicles include components that are typically positioned for conventional driving along a roadway. For example, a tire can be aligned with the roadway such that a surface of the tire substantially evenly contacts the roadway. To adjust the components to operate the vehicle in a different manner, e.g., to adjust the tire to increase handling during a turn, can be difficult, e.g., can require disassembly of one or more vehicle components.

BRIEF DESCRIPTION OF THE DRAWINGS

FIG. 2 is a side view of an example suspension.

FIG. 3 is a side view of the example suspension of FIG. 2 adjusting the camber angle of an example wheel.

DETAILED DESCRIPTION

Figure 1:
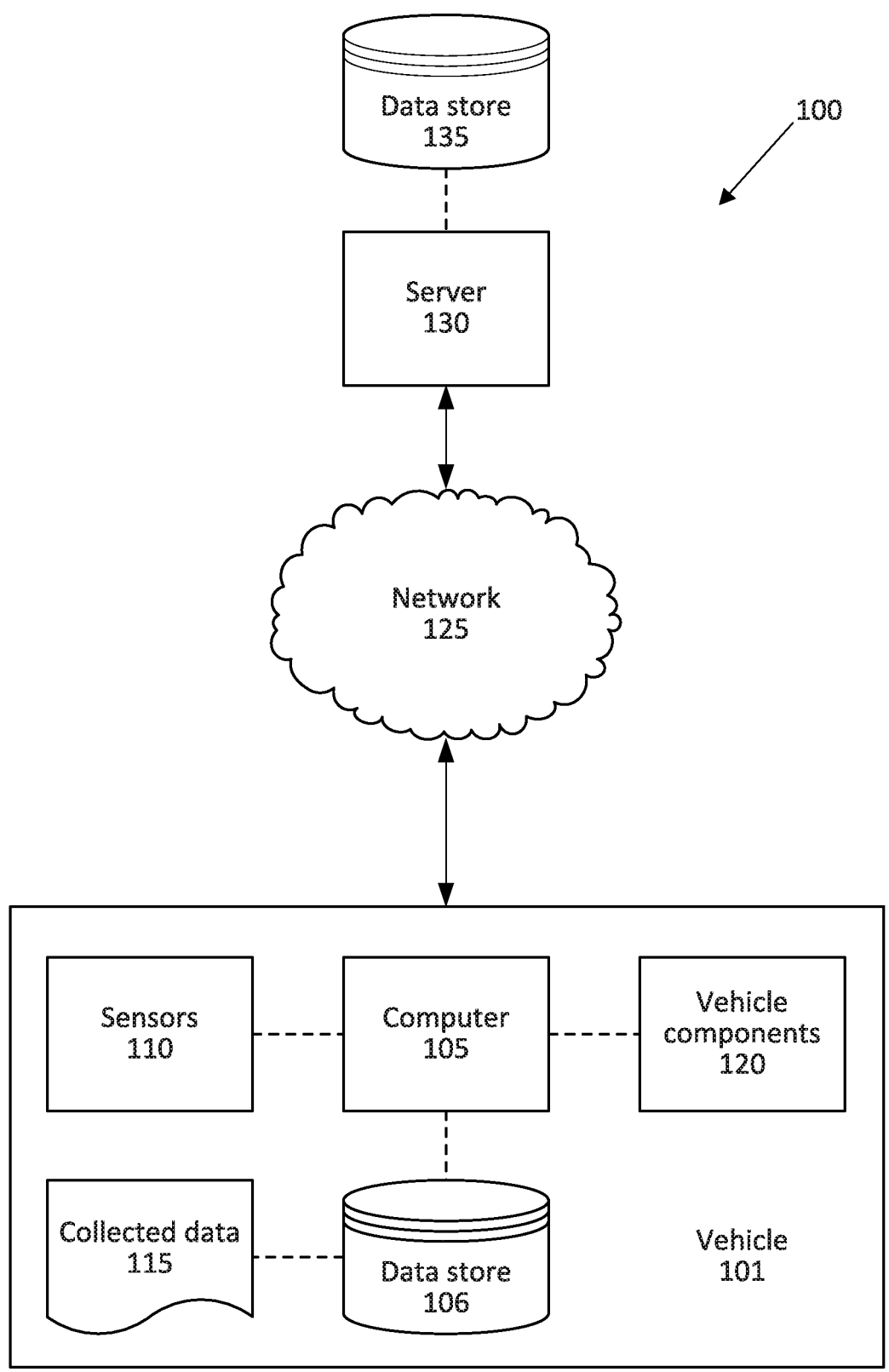
FIG. 1 is a block diagram of an example system for adjusting a vehicle wheel camber angle.
Figure 4:
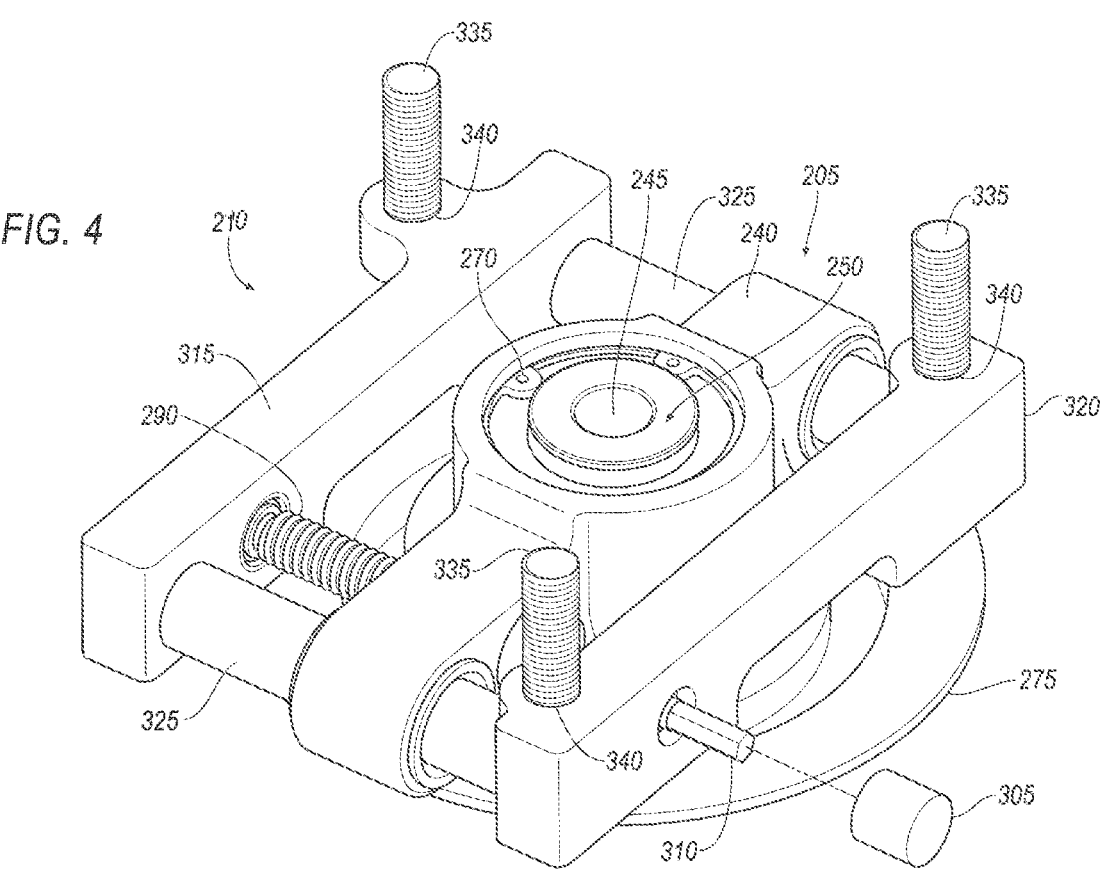
FIG. 4 is a perspective view of an example strut mount.
Figure 5:
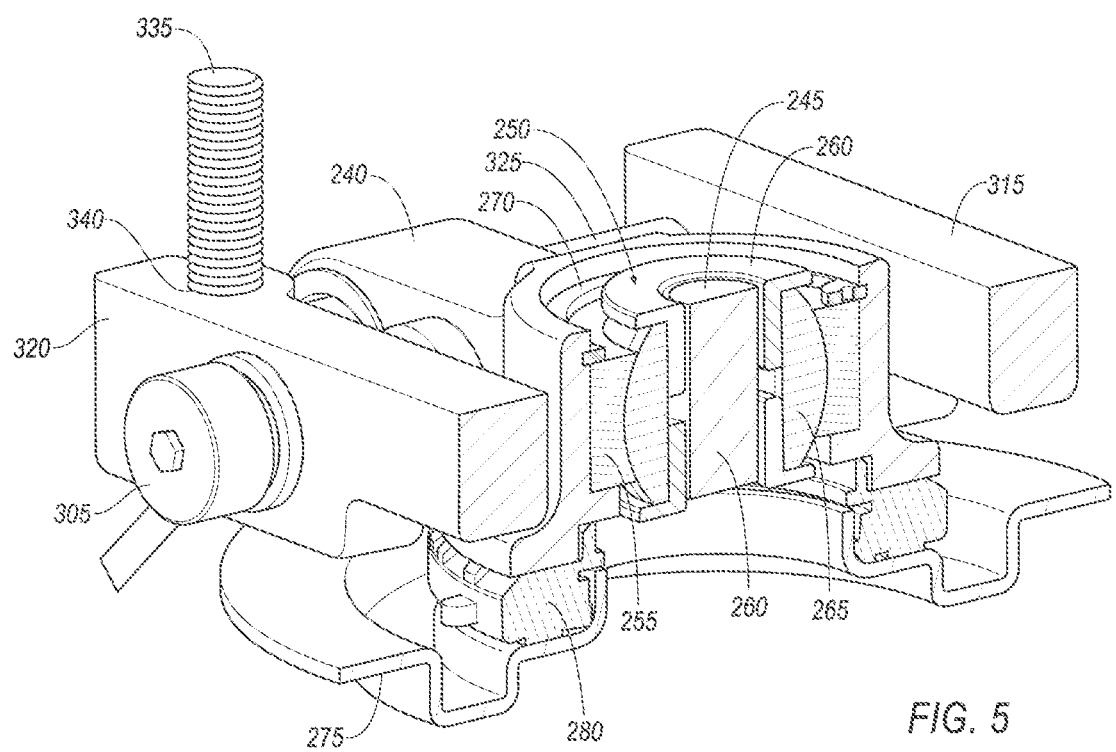
FIG. 5 is a cross-sectional view of the example strut mount of FIG. 4.

An assembly includes a leadscrew, a strut movable along the leadscrew upon rotation of the leadscrew, a camber angle of a wheel changeable according to movement of the strut along the leadscrew, and a motor drivably connected to a rotating shaft that is mounted to the leadscrew.

The strut can include a housing and a rod supported by the housing, and the housing can be supported by the leadscrew.

The housing can include threads engaging the leadscrew.

The threads can be arranged to move the housing along the leadscrew.

The housing can include a bearing, and the rod can be supported by the bearing.

The assembly can further include a first end carrier and a second end carrier. The leadscrew can extend between the first end carrier and the second end carrier.

The rotating shaft can be arranged to rotate the leadscrew.

The assembly can further include a shock absorber disposed between the wheel and the strut.

The assembly can further include a steering knuckle connected to the shock absorber and connected to the wheel.

A system includes a computer including a processor and a memory, the memory storing instructions executable by the processor to receive user input specifying an operation mode of a vehicle, the operation mode associated with a specified camber angle of a wheel, and to move a strut along a leadscrew to provide the specified camber angle.

The operation mode can further include a setting for a shock absorber.

The instructions can further include instructions to rotate the leadscrew to a specified angle to move the strut to a specified position on the leadscrew corresponding to the specified camber angle.

The strut can include a housing and a rod supported by the housing, and the housing can be supported by the leadscrew.

The instructions can further include instructions to actuate a motor to move the strut along the leadscrew to provide the specified camber angle.

The instructions can further include instructions to, upon receiving the specified operation mode, identify a rotation angle to move the strut along the leadscrew to provide the specified camber angle and to actuate the motor to rotate to the rotation angle.

A system includes means for receiving user input specifying an operation mode of a vehicle, the operation mode associated with a specified camber angle of a wheel, and means for moving a strut along a leadscrew to provide the specified camber angle.

The operation mode can further include a setting for a shock absorber.

The system can further include means for rotating the leadscrew to a specified angle to move the strut to a specified position on the leadscrew corresponding to the specified camber angle.

The strut can include a housing and a rod supported by the housing, and the housing can be supported by the leadscrew.

The housing can include means for moving the housing along the leadscrew.

A method of providing a camber angle of a wheel with an assembly, the assembly including a leadscrew, a strut movable along the leadscrew upon rotation of the leadscrew, a camber angle of a wheel changeable according to movement of the strut along the leadscrew, and a motor drivably connected to a rotating shaft that is mounted to the leadscrew, includes receiving user input specifying an operation mode of a vehicle, the operation mode associated with a specified camber angle of the wheel, and moving the strut along the leadscrew to provide the specified camber angle.

The method can further include rotating the leadscrew to a specified angle to move the strut to a specified position on the leadscrew corresponding to the specified camber angle.

The method can further include actuating the motor to move the strut along the leadscrew to provide the specified camber angle.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

An assembly includes a leadscrew, a strut, and a motor. The strut is movable along the leadscrew upon rotation of the leadscrew. A camber angle of a wheel is changeable according to movement of the strut along the leadscrew. The motor is drivably connected to a rotating shaft. The rotating shaft is mounted to the leadscrew.

Changing the camber angle of the wheel adjusts contact of a tire with a roadway, which can improve handling of a vehicle in a turn while increasing wear on the tire from uneven distribution of a surface of the tire on the roadway. Determining a camber angle for the wheel can require selection from competing design choices, weighing improving handling at the cost of increased wear on the tire. Manually changing the camber angle can be time-consuming and difficult, requiring disassembly of a strut and installation of additional components (e.g., camber plates) for each adjustment to the camber angle. The camber plates may be costly and difficult to install.

A user can provide input to a computer which actuates a strut mount to change the camber angle without disassembly of the vehicle, easing adjustment of the camber angle. Adjusting the camber angle with the computer reduces overall wear on the tire by returning the camber angle to evenly distribute the surface of the tire on the roadway when the improved handling is no longer required. The computer can actuate the motor to rotate the leadscrew. Rotating the leadscrew moves the strut, changing the camber angle. The user can adjust the camber angle of the wheel by providing input to the computer rather than manually adjusting the camber angle with, e.g., a manually adjustable mount. The strut mount that moves the strut to provide the camber angle allows the user to adjust the camber angle based on a preferred operation mode, e.g., an operation mode corresponding to vehicle operation on a track, an operation mode corresponding to conventional vehicle operation on a roadway, etc.

The user can provide input regarding an operation mode of the vehicle to the computer. The operation mode can include settings for vehicle components, e.g., traction control, stability control, throttle response, shock absorber damping, etc. Each operation mode adjusts the components for a particular type of driving, e.g., conventional roadway driving, racetrack driving, fuel-saving driving, etc. The computer can associate a camber angle with each operation mode based on the type of driving associated with the operation mode. Upon receiving the input for the operation mode, the computer can actuate the strut mount to move the wheel to the camber angle associated with the operation mode.

FIG. 1 illustrates an example system 100 for adjusting a camber angle of a wheel in a vehicle 101. A computer 105 in the vehicle 101 is programmed to receive collected data 115 from one or more sensors 110. For example, vehicle 101 data 115 may include a location of the vehicle 101, data about an environment around a vehicle, data about an object outside the vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a conventional vehicle 101 communications bus. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 can be of any type, e.g., hard disk drives, solid state drives, servers, or any volatile or non-volatile media. The data store 106 can store the collected data 115 sent from the sensors 110.

Sensors 110 can include a variety of devices. For example, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a position of a component, evaluating a slope of a roadway, etc. The sensors 110 could, without limitation, also include short range radar, long range radar, LIDAR, and/or ultrasonic transducers.

Collected data 115 can include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 can include a plurality of vehicle components 120. In this context, each vehicle component 120 includes one or more hardware components adapted to perform a mechanical function or operation—such as moving the vehicle 101, slowing or stopping the vehicle 101, steering the vehicle 101, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, or the like.

When the computer 105 operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computer 105. A semi-autonomous mode is one in which at least one of vehicle 101 propulsion (typically via a powertrain including an electric motor and/or internal combustion engine), braking, and steering are controlled at least partly by the computer 105 as opposed to a human operator. In a non-autonomous mode, i.e., a manual mode, the vehicle 101 propulsion, braking, and steering are controlled by the human operator.

The system 100 can further include a network 125 connected to a server 130 and a data store 135. The computer 105 can further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

FIGS. 2-3 illustrate an example suspension 200. The suspension 200 includes a strut 205 and a strut mount 210. The suspension 200 can include a tower cap 215 and a steering knuckle 220. The suspension 200 is attached to a wheel 225. The strut 205 connects the strut mount 210 to the steering knuckle 220. The strut 205 is connected to the wheel 225 via the steering knuckle 220.

The suspension 200 includes the strut 205. The strut 205 includes a strut body 230 and a shock absorber 235. The strut body 230 connects the shock absorber 235 to the steering knuckle 220. The strut body 230 supports the shock absorber 235.

The strut 205 can include the shock absorber 235. The shock absorber 235 can be, e.g., a passive shock absorber that absorbs vibrations without additional input to the passive shock absorber, a semi-active shock absorber that includes an additional component (e.g., a fluid valve, a controller, etc.) that actively controls at least one portion of the semi-active shock absorber nut does not add additional energy to absorb the vibrations, an active shock absorber that includes an additional component that introduces an energy-absorbing medium to reduce vibrations, etc. For example, the shock absorber 235 can be a twin-tube shock absorber with a magnetorheological fluid. The shock absorber 235 can include an electromagnet (not shown). The computer 105 can actuate the electromagnet to increase a viscosity of the magnetorheological fluid, adjusting the shock absorbing capacity of the shock absorber 235. The computer 105 can actuate the electromagnet to a specified setting to adjust the shock absorber 235 to a specific viscosity.

The suspension 200 can include the tower cap 215. The tower cap 215 connects the strut mount 210 to the vehicle 101 body. The tower cap 215 can secure the strut mount 210 to the vehicle 101 body.

The suspension 200 can include the steering knuckle 220. The steering knuckle 220 connects the shock absorber 235 to the wheel 225. The steering knuckle 220 can be connected to a steering rack (not shown). The steering knuckle 220 can transmit movement of the steering rack to the wheel 225, turning the wheel 225 to steer the vehicle 101.

The vehicle 101 includes at least one wheel 225. The wheel 225 includes a hub 226 and a tire 227. The hub 226 connects the steering knuckle 220 to the tire 227. The steering knuckle 220 can transmit movement of the steering rack to the hub 226, turning the wheel 225 to steer the vehicle 101. The tire 227 contacts a roadway, moving the vehicle 101 along the roadway. The wheel 225 defines a camber angle $\theta$ relative to a vertical axis Z. FIG. 2 shows an example camber angle $\theta$ of substantially $-1°$, which can correspond to a "normal" operating mode, as described below. FIG. 3 shows a camber angle $\theta$ of substantially $-2.5°$, which can correspond to a "track" operating mode, as described below. When the camber angle $\theta$ directs the wheel 225 toward the strut 205 (i.e., in an inboard direction of the vehicle 101), as shown in FIG. 3, the camber angle $\theta$ is negative. When the camber angle $\theta$ directs the wheel 225 away from the strut 205 (i.e., in an outboard direction of the vehicle 101), the camber angle $\theta$ is positive. When the camber angle $\theta$ is near zero, e.g., $-1°$ as shown in FIG. 2, substantially all of an outer surface of the tire 227 contacts the roadway, evenly distributing contact along the outer surface. When the camber angle $\theta$ is greater than zero, as shown in FIG. 3, portions of the tire 227 can have more contact with the roadway than other portions, which can improve operation of the vehicle 101 in a turn. For example, as shown in FIG. 3, when the camber angle $\theta$ is substantially $-2.5°$, an outward portion 227$a$ of the tire 227 can have decreased contact with the roadway and an inward portion 227$b$ of the tire 227 can have increased contact with the roadway, improving turning of the vehicle 101.

Figure 6:
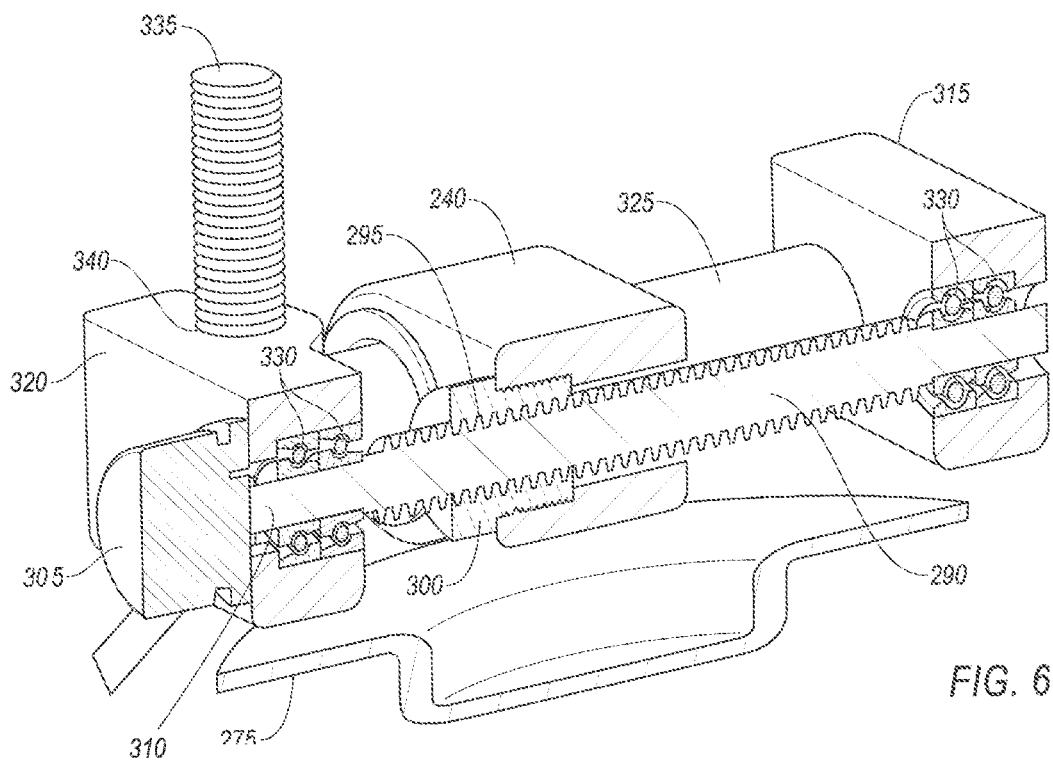
FIG. 6 is a cross-sectional view of the example strut mount of FIG. 4.
Figure 7:
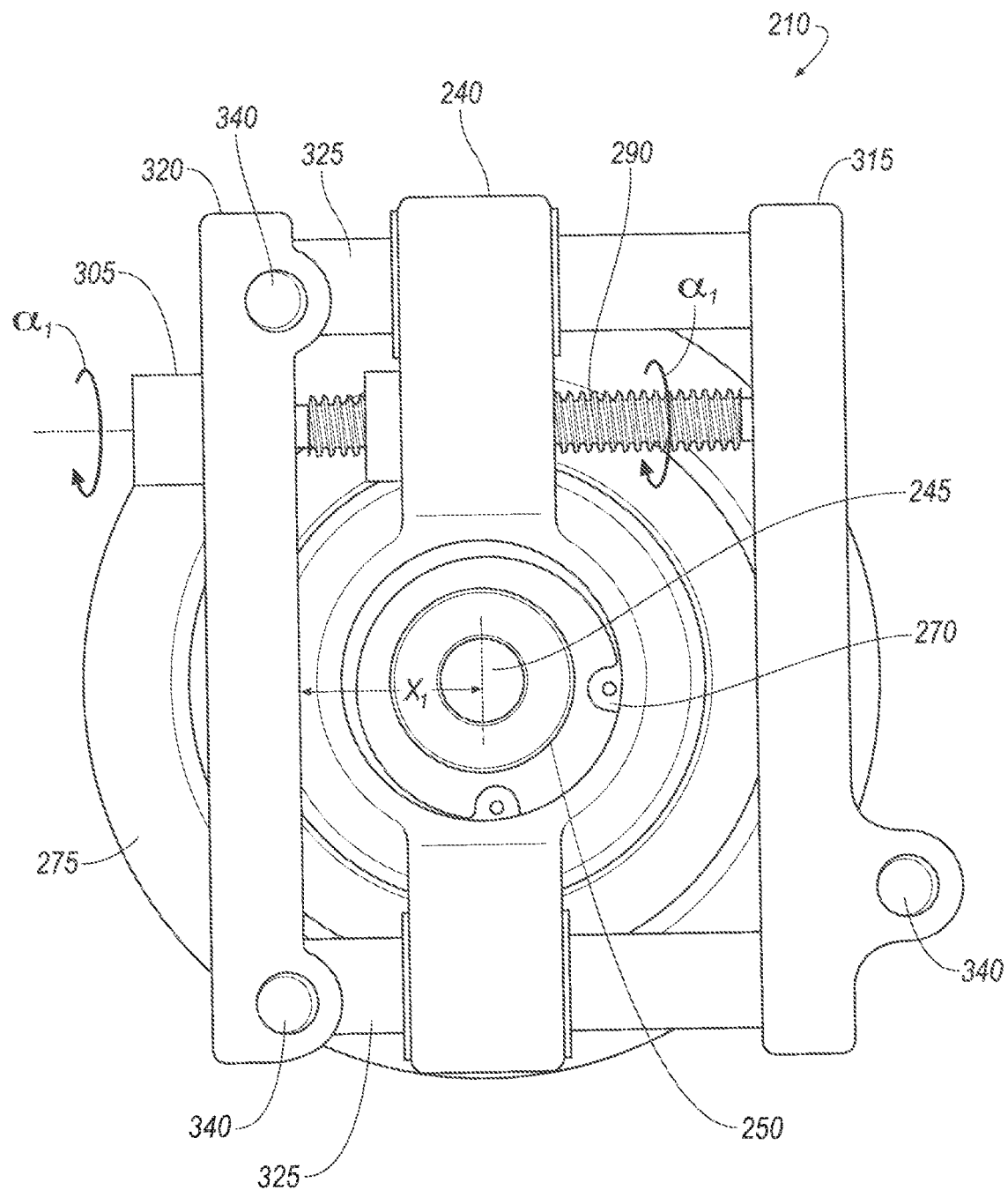
FIG. 7 is a plan view of the example strut mount of FIG. 4.
Figure 8:
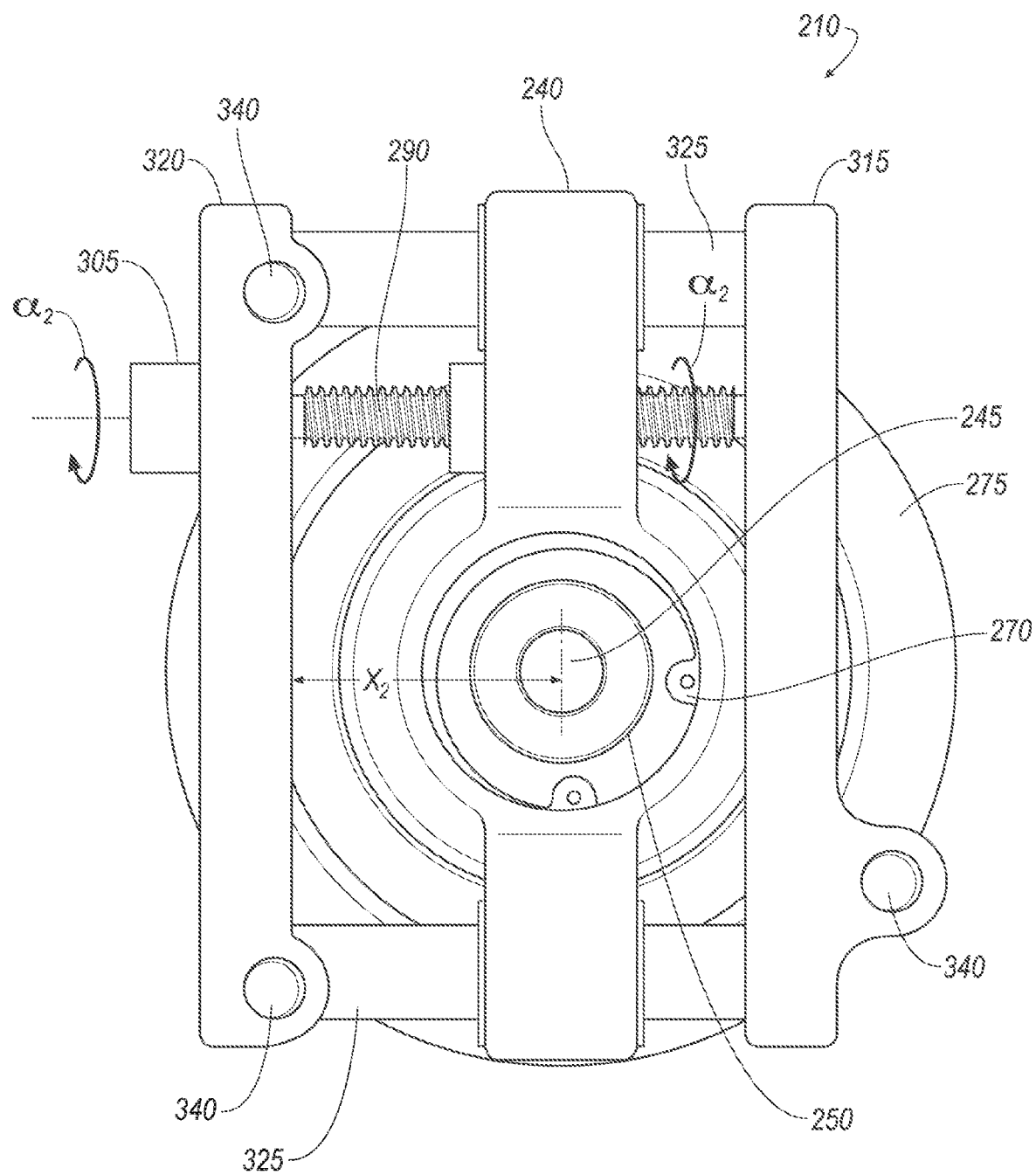
FIG. 8 is a plan view of the example strut mount of FIG. 4.

FIGS. 4-8 show an example strut 205 and an example strut mount 210. The strut mount 210 supports the strut 205. The strut mount 210 moves the strut 205 to adjust the camber angle $\theta$ of the wheel 225. For example, the strut mount 210 can move the strut 205 from a first position $X_1$, as shown in FIG. 7, to a second position $X_2$, as shown in FIG. 8. The strut mount 210 is connected to the vehicle 101 body (not shown).

The strut 205 includes a housing 240. The housing 240 is supported by the strut mount 210. The housing 240 is movable along the strut mount 210. The position X of the housing 240 along the strut mount 210 corresponds to a specific camber angle $\theta$ of the wheel 225, as described below.

The strut 205 includes a rod 245. The rod 245 is supported by the housing 240. The rod 245 is connected to the wheel 225 via the shock absorber 235, the strut body 230, and the steering knuckle 220. As the housing 240 moves along the strut mount 210, the rod 245 moves the wheel 225 to the specified camber angle $\theta$.

The housing 240 includes a bearing 250 and a bearing contact 255. The bearing 250 includes an adapter 260 and a roller 265. The adapter 260 supports the rod 245. The adapter 260 is connected to the roller 265. The roller 265 contacts the bearing contact 255. The roller 265 rotates relative to the bearing contact 255. The bearing 250 can be, e.g., a spherical bearing, a bushing, etc. When the bearing 250 is a spherical bearing, the roller 265 is substantially spherical. Alternatively, the roller 265 can be a different shape that rotates relative to the bearing contact 255. When the bearing 250 is a bushing, the bearing 250 can be, e.g., rubber, polyurethane, Teflon®, nylon, etc. The adapter 260 rotates the roller 265 relative to the bearing contact 255, allowing the rod 245 to pivot relative to the housing 240. When the housing 240 moves, the housing 240 pushes on the roller 265, moving the adapter 260 to allow the rod 245 to pivot. Alternatively, the housing 240 can lack a bearing contact 255, e.g., when the bearing 250 is a bushing.

The housing 240 can include a ring 270. The ring 270 connects the bearing 250 to the housing 240. Alternatively, the bearing 250 can be connected directly to the housing 240. The ring 270 can extend around the bearing 250 to connect the bearing 250 to the housing 240. The ring 270 can connect the bearing 250 to the housing 240 with a snap fit or other suitable securing mechanism.

The bearing 250 can transfer loads from the rod 245 to the housing 240. The bearing 250 allows the rod 245 to pivot relative to the housing 240. As the housing 240 moves along the strut mount 210, the rod 245 pivots relative to the housing 240, causing the wheel 225 to pivot to the camber angle $\theta$.

The strut 205 includes a spring seat 275. The spring seat 275 is connected to a spring (not shown). The strut 205 can include a strut bearing 280. The strut bearing 280 is disposed between the spring seat 275 and the strut mount 210. The strut bearing 280 allows the spring seat 275 to move relative to the strut mount 210.

The strut mount 210 includes a leadscrew 290. The leadscrew 290 can be, e.g., a threaded rod. The housing 240 includes threads 295 that engage the leadscrew 290. For example, as shown in FIG. 6, the housing 240 can include a threaded nut 300 that includes threads 295. The threads 295 mate with corresponding threads of the leadscrew 290. The threads 295 are arranged to move the housing 240 along the leadscrew 290. As the leadscrew 290 rotates, the leadscrew 290 pushes on the threads 295, moving the threaded nut 300 axially along the leadscrew 290. The threaded nut 300 moves the housing along the leadscrew 290, and the housing 240 moves the rod 245, which moves the wheel 225 to a specified camber angle θ. Thus, rotation of the leadscrew 290 corresponds to movement of the wheel 225 to a specified camber angle θ.

The strut mount 210 includes a motor 305 and a rotating shaft 310. The motor 305 is drivably connected to the rotating shaft 310, i.e., the motor 305 is connected to the rotating shaft 310 to drive rotation of the rotating shaft 310. The rotating shaft 310 is arranged to rotate the leadscrew 290. The computer 105 actuates the motor 305 to rotate the leadscrew 290. The motor 305 can be, e.g., a brushless DC electric motor, an AC motor, etc.

The strut mount 210 includes a first end carrier 315, a second end carrier 320, and connecting rods 325 extending from the first end carrier 315 to the second end carrier 320. The leadscrew 290 extends between the first end carrier 315 and the second end carrier 320. The first end carrier 315 and the second end carrier 320 support the leadscrew 290. The connecting rods 325 support the housing 240. The housing 240 moves along the connecting rods 325 between the first end carrier 315 and the second end carrier 320.

The strut mount 210 can include leadscrew bearings 330, as shown in FIG. 6. The leadscrew bearings 330 are supported by the first end carrier 315 and the second end carrier 320. The leadscrew bearings 330 allow the leadscrew 290 to rotate relative to the first end carrier 315 and relative to the second end carrier 320. The leadscrew bearings 330 can be, e.g., roller bearings, ball bearings, bushings, etc.

The strut mount 210 includes a plurality of mounting studs 335. The mounting studs 335 connect the strut mount 210 to the vehicle 101 body. For example, the mounting studs 335 can connect the strut mount 210 to the tower cap 215. The mounting studs 335 can be, e.g., threaded rods, bolts, dowels, etc. The mounting studs 335 can prevent movement of the strut mount 210 relative to the vehicle 101 body.

The strut mount 210 includes a plurality of mounting stud slots 340 (best seen in FIGS. 7-8). The mounting studs 335 are each disposed in respective mounting stud slots 340. The mounting stud slots 340 can be disposed in the first end carrier 315 and the second end carrier 320. The mounting stud slots 335 can be threaded to mate with the mounting studs 340.

FIGS. 7-8 show the example strut 205 moving along the leadscrew 290. FIG. 7 shows the housing 240 at a first position $X_1$ on the leadscrew. FIG. 8 shows the housing 240 at a second position $X_2$ on the leadscrew. The camber angle θ of the wheel 225 when the housing 240 is in the first position $X_1$ differs from the camber angle θ of the wheel 225 when the housing 240 is in the second position $X_2$. Upon receiving user input, the motor 305 can rotate the leadscrew 290 to move the housing 240 from the first position $X_1$ to the second position $X_2$. As described below, the first position $X_1$ and the second position $X_2$ each correspond to a camber angle θ of the wheel 225.

The computer 105 can include an operation mode stored in the data store 106. The "operation mode" is a predetermined list of settings for vehicle components 120 associated with specific types of operation of the vehicle 101. For example, the computer 105 can include a "normal" operation mode in which the settings for the vehicle components 120 are determined for conventional operation of the vehicle 101 on a roadway. In another example, the computer 105 can include a "track" operation mode in which the settings for the vehicle components 120 are determined for use on a race track. In another example, the computer 105 can include a "tow" operation mode in which the settings for the vehicle components are determined for use when towing cargo. In another example, the computer 105 can include an "eco" operation mode in which the settings for the vehicle components are determined to reduce fuel consumption.

The computer 105 receives user input specifying the operation mode. The user can provide input to a human-machine interface (HMI) (not shown), e.g., a touchscreen, a button, a lever, a rotating dial, etc. Upon receiving the user input, the computer 105 can actuate components 120 to settings associated with the operation mode, e.g., a camber angle θ, a shock absorber stiffness, a steering assist stiffness, etc.

The operation mode can be associated with a specified camber angle θ. As described above, the camber angle θ can adjust contact of the tire 227 with the roadway, affecting turning of the vehicle 101. In a "track" operation mode, the computer 105 can adjust the camber angle θ to a specified value to improve handling of the vehicle 101 turning around a corner, e.g., −1.75°, −2.5°, −3.1°, etc. In a "normal" operation mode, the computer 105 can adjust the camber angle θ to a lower value, e.g., 0°, −1°, etc., than the camber angle θ associated with the "track" operation mode to reduce wear on the tire 227.

The operation mode can be associated with a specified shock absorber setting. As described above, the computer 105 can actuate components 120 to adjust shock absorbing characteristics of the shock absorber 235. For example, the computer 105 can actuate an electromagnet to increase a viscosity of a magnetorheological fluid in the shock absorber 235, increasing absorption of vibrations by the shock absorber 235. In another example, the computer 105 can actuate a solenoid fluid valve to move hydraulic fluid between tubes of a twin-tube shock absorber.

When the user provides input for a specific operation mode, the computer 105 can move the wheel 225 to the camber angle θ associated with the operation mode. The computer 105 can actuate the motor 305 to rotate the leadscrew 290 to a specified rotation angle α, moving the housing 240 along the leadscrew 290. The specified rotation angle α corresponds to a position X of the housing 240 along the leadscrew 290, as described below. The position X of the housing 240 moves the rod 245, which moves the steering knuckle 220 and the wheel 225 to the specified camber angle θ. Thus, the computer 105 moves the strut 205 along the leadscrew 290 to provide the camber angle θ associated with the operation mode.

The motor 305 rotates the leadscrew 290 to a specified rotation angle α. The "rotation angle" a is the angle of rotation the motor 305 rotates the rotating shaft 310. The motor 305 can include a rotation sensor 110 that collect data 115 of the rotation angle α. Because the rotating shaft 310 is mounted to the leadscrew 290, the leadscrew 290 rotates to the rotation angle α. As described above, rotation of the leadscrew 290 moves the housing 240 along the leadscrew 290 to a specific position X, i.e., the rotation angle α corresponds to a specific position X of the housing 240 along the leadscrew 290. For example, the rotation angle $α_1$, shown in FIG. 7, corresponds to the position $X_1$ of the housing 240 along the leadscrew 290, and the rotation angle α₂, as shown in FIG. 8, corresponds to the position $X_2$ of the housing 240 along the leadscrew 290. The distance along the leadscrew 290 between the positions $X_1$ and $X_2$ can be, e.g., 15 mm. The position X of the housing 240 along the leadscrew 290 corresponds to a specific camber angle θ. For example, the position $X_1$ can correspond to a camber angle θ of −1°. In another example, the position $X_2$ can correspond to a camber angle θ of −2.5°.

The computer 105 can actuate the motor 305 to rotate the rotating shaft 310 to a specified rotation angle α to provide a camber angle θ associated with the selected operation mode. For example, the computer 105 can actuate the motor 305 to rotate the rotating shaft 310 to the rotation angle $α_1$, as shown in FIG. 7, to provide a camber angle θ of −1° associated with a "normal" operation mode. In another example, the computer 105 can actuate the motor 305 to rotate the rotating shaft 310 to the rotation angle $α_2$ to provide a camber angle θ of −2.5° associated with a "track" operation mode. The rotation angle α corresponding to the camber angle θ can be determined based on, e.g., empirical testing, suspension modeling, etc., and can be stored in the data store 106 and/or the server 130. For example, the leadscrew 290 can have a predetermined spacing between threads, i.e., a thread pitch, and rotating the leadscrew 290 one rotation (i.e., 360°) moves the housing 240 along the leadscrew 290 by the predetermined spacing. The thread pitch of the leadscrew 290 can be, e.g., 1 mm, 1.5 mm, 2 mm, etc. Thus, when the motor 305 rotates the rotating shaft 310 by 360°, the housing 240 moves along the leadscrew 290 by the thread pitch. For example, if the thread pitch of the leadscrew 290 is 1.5 mm and the distance between the first position $X_1$ and the second position $X_2$ is 15 mm, the computer 105 can instruct the motor 305 to rotate the leadscrew 290 ten rotations (i.e., 3600°) to move the housing 240 along the leadscrew 290 by 15 mm to the second position $X_2$. That is, the second rotation angle $α_2$ can be 3600° greater than the first rotation angle $α_1$. Empirical testing can correlate the position X along the leadscrew 290 to the camber angle θ, and based on the thread pitch, the computer 105 can determine the rotation angle α to move the housing 240 to the position X corresponding to the camber angle θ.

Alternatively or additionally, the housing 240 and/or the leadscrew 290 can include a limit switch and/or a linear motion sensor 110 programmed to detect the position X of the housing 240 along the leadscrew 290. The computer 105 can actuate the motor 305 to rotate the rotating shaft 310 until receiving data 115 from the limit switch and/or the linear motion sensor 110 indicating that the housing 240 is within a distance threshold of the position X corresponding to the specified camber angle θ. The distance threshold can be determined based on a tolerance threshold of the camber angle θ. The specified camber angle θ can have a tolerance threshold (e.g., 0.05°) based on, e.g., empirical testing of tire 227 contact, and the tolerance threshold can correspond to a distance threshold of the position X (e.g., 0.5 mm), i.e., moving the housing 240 by 0.5 mm can result in a change of camber angle θ of 0.05°, and when the computer 105 determines that the current position X of the housing 240 is within the distance threshold of the specified position X, the computer 105 can determine that the current camber angle θ is within the tolerance threshold of the specified camber angle θ.

The computer 105 can refer to a lookup table stored in the data store 106 and/or the server 130. For example, for a leadscrew 290 thread pitch of 1.5 mm, the computer 105 can refer to Table 1 to determine the rotation angle α required for a specified camber angle θ.

TABLE 1

| Rotation Angle α (degrees) | Camber Angle θ (degrees) |
| --- | --- |
| 0 | −1.00 |
| 1200 | −1.50 |
| 1800 | −1.75 |
| 3600 | −2.50 |

Figure 9:
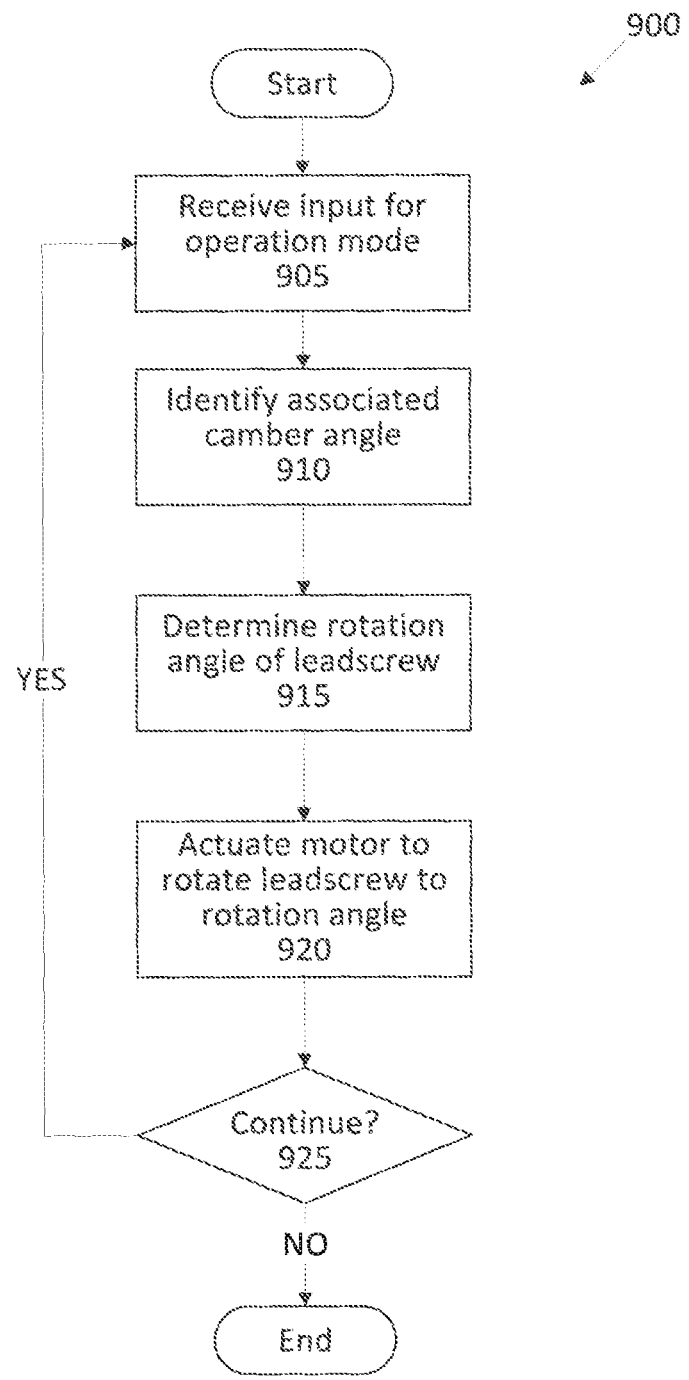
FIG. 9 is a block diagram of an example process for adjusting the camber angle.

FIG. 9 is a block diagram of an example process 900 for moving a wheel 225 to a specified camber angle θ. The process 900 begins in a block 905, in which the computer 105 receives input for a specified operation mode of the vehicle 101 from a user. As described above, the user can provide input to a HMI, e.g., a touchscreen, a button, a lever, etc. The input specifies one of a plurality of operation modes, e.g., a "normal" operation mode, a "track" operation mode, a "tow" operation mode, etc.

Next, in a block 910, the computer 105 identifies a camber angle θ associated with the operation mode. As described above, the camber angle θ can affect handling of the vehicle 101, and the operation mode can be associated with a specified camber angle θ to provide handling associated with the operation mode. The associated camber angle θ can be stored in the data store 106 and/or the server 130, e.g., in a lookup table or the like as described above.

Next, in a block 915, the computer 105 determines a rotation angle α of a leadscrew 290 to provide the camber angle θ. As described above, the rotation angle α of the leadscrew 290 corresponds to a position X of a strut 205 along the leadscrew 290, which corresponds to the camber angle θ. For example, the computer 105 can store a lookup table in the data store 106 that includes rotation angles corresponding to the camber angles θ associated with each operation mode.

Next, in a block 920, the computer 105 actuates the motor 305 to rotate the leadscrew 290 to the rotation angle α. The computer 105 can actuate the motor 305, which rotates the rotating shaft 310 mounted to the leadscrew 290. As the motor 305 rotates the leadscrew 290, the leadscrew 290 moves the strut 205 along the leadscrew 290, moving the wheel 225 to the camber angle θ.

Next, in a block 925, the computer 105 determines whether to continue the process 900. For example, the computer 105 can determine not to continue the process 900 when the vehicle 101 is stopped and powered off. If the computer 105 determines to continue, the process 900 returns to the block 905 to receive additional user input. Otherwise, the process 900 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computing devices discussed herein, including the computer 105 and server 130 include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 900, one or more of the steps could be omitted, or the steps could be executed in a different order than shown in FIG. 9. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. An assembly, comprising:
a leadscrew;
a strut movable along the leadscrew upon rotation of the leadscrew, a camber angle of a wheel changeable according to movement of the strut along the leadscrew; and
a motor drivably connected to a rotating shaft that is mounted to the leadscrew,
wherein the motor, the rotating shaft, and the leadscrew rotate about a common axis.

2. The assembly of claim 1, wherein the strut includes a housing and a rod supported by the housing, and the housing is supported by the leadscrew.

3. The assembly of claim 2, wherein the housing includes threads engaging the leadscrew.

4. The assembly of claim 3, wherein the threads are arranged to move the housing along the leadscrew.

5. The assembly of claim 2, wherein the housing includes a bearing, and the rod is supported by the bearing.

6. The assembly of claim 1, further comprising a first end carrier and a second end carrier, wherein the leadscrew extends between the first end carrier and the second end carrier.

7. The assembly of claim 1, wherein the rotating shaft is arranged to rotate the leadscrew.

8. The assembly of claim 1, further comprising a shock absorber disposed between the wheel and the strut.

9. The assembly of claim 8, further comprising a steering knuckle connected to the shock absorber and connected to the wheel.

10. A system, comprising a computer including a processor and a memory, the memory storing instructions executable by the processor to:
receive user input specifying an operation mode of a vehicle, the operation mode associated with a specified camber angle of a wheel; and
actuate a motor to move a strut along a leadscrew to provide the specified camber angle, the motor, the rotating shaft, and the leadscrew rotating about a common axis.

11. The system of claim 10, wherein the operation mode further includes a setting for a shock absorber.

12. The system of claim 10, wherein the instructions further include instructions to rotate the leadscrew to a specified angle to move the strut to a specified position on the leadscrew corresponding to the specified camber angle.

13. The system of claim 10, wherein the strut includes a housing and a rod supported by the housing, and the housing is supported by the leadscrew.

14. The system of claim 10, wherein the instructions further include instructions to actuate the motor to move the strut along the leadscrew to provide the specified camber angle.

15. The system of claim 14, wherein the instructions further include instructions to, upon receiving the specified operation mode, identify a rotation angle to move the strut along the leadscrew to provide the specified camber angle and to actuate the motor to rotate to the rotation angle.

16. A system, comprising:
a leadscrew;
a strut movable along the leadscrew upon rotation of the leadscrew; and
a motor drivably connected to a rotating shaft that is mounted to the leadscrew, the motor, the rotating shaft, and the leadscrew rotating about a common axis;
means for receiving user input specifying an operation mode of a vehicle, the operation mode associated with a specified camber angle of a wheel; and means for actuating the motor to move the strut along the leadscrew to provide the specified camber angle.

17. The system of claim 16, wherein the operation mode further includes a setting for a shock absorber.

18. The system of claim 16, further comprising means for rotating the leadscrew to a specified angle to move the strut to a specified position on the leadscrew corresponding to the specified camber angle.

19. The system of claim 16, wherein the strut includes a housing and a rod supported by the housing, and the housing is supported by the leadscrew.

20. The system of claim 19, wherein the housing includes means for moving the housing along the leadscrew.

* * * * *